United States Patent
Kleeman et al.

(10) Patent No.: US 10,527,754 B2
(45) Date of Patent: *Jan. 7, 2020

(54) LONG-RANGE TEMPERATURE FORECASTING

(71) Applicant: The Climate Corporation, San Francisco, CA (US)

(72) Inventors: Alex Kleeman, San Francisco, CA (US); Holly Dail, Seattle, WA (US)

(73) Assignee: THE CLIMATE CORPORATION, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/240,610

(22) Filed: Jan. 4, 2019

(65) Prior Publication Data
US 2019/0179054 A1 Jun. 13, 2019

Related U.S. Application Data

(63) Continuation of application No. 15/066,958, filed on Mar. 10, 2016, now Pat. No. 10,175,387.

(51) Int. Cl.
G01W 1/10 (2006.01)
G06Q 10/04 (2012.01)
G06Q 50/02 (2012.01)

(52) U.S. Cl.
CPC .............. *G01W 1/10* (2013.01); *G06Q 10/04* (2013.01); *G06Q 50/02* (2013.01)

(58) Field of Classification Search
CPC combination set(s) only.
See application file for complete search history.

(56) References Cited

U.S. PATENT DOCUMENTS 9,076,118 B1 7/2015 Mewes et al.
9,336,492 B1 * 5/2016 Mewes .............. A01B 79/005
(Continued)

FOREIGN PATENT DOCUMENTS

WO WO 2013/086610 A1 6/2013

OTHER PUBLICATIONS

International Seaching Authority, "Search Report" in application No. PCT/US17/21663, dated Jun. 12, 2017, 7 pages.
(Continued)

*Primary Examiner* — Mamadou L Diallo
(74) *Attorney, Agent, or Firm* — Hickman Palermo Becker Bingham LLP; Malgorzata A. Kulczycka

(57) ABSTRACT

In an approach, a computer receives an observation dataset that identifies one or more ground truth values of an environmental variable at one or more times and a reforecast dataset that identifies one or more predicted values of the environmental variable produced by a forecast model that correspond to the one or more times. The computer then trains a climatology on the observation dataset to generate an observed climatology and trains the climatology on the reforecast dataset to generate a forecast climatology. The computer identifies observed anomalies by subtracting the observed climatology from the observation dataset and forecast anomalies by subtracting the forecast climatology from the reforecast dataset. The computer then models the observed anomalies as a function of the forecast anomalies, resulting in a calibration function, which the computer can then use to calibrate new forecasts received from the forecast model.

20 Claims, 10 Drawing Sheets

(56) References Cited

U.S. PATENT DOCUMENTS

| | | | |
|---|---|---|---|
| 2002/0103688 A1 | 8/2002 | Schieider | |
| 2012/0215729 A1 | 8/2012 | Johnson | |
| 2013/0024118 A1* | 1/2013 | Gershunov | G01W 1/10 |
| | | | 702/3 |
| 2013/0346523 A1* | 12/2013 | Praun | H04L 51/20 |
| | | | 709/206 |
| 2015/0193713 A1* | 7/2015 | Giunta | G01W 1/10 |
| | | | 705/7.25 |
| 2015/0330817 A1* | 11/2015 | Law | G01D 21/02 |
| | | | 702/3 |
| 2016/0025896 A1* | 1/2016 | Rose | G01W 1/02 |
| | | | 702/3 |
| 2016/0148229 A1* | 5/2016 | Root | G06Q 10/06 |
| | | | 705/7.31 |
| 2016/0187535 A1* | 6/2016 | Maschhoff | G01W 1/10 |
| | | | 250/338.5 |

OTHER PUBLICATIONS

Current Claims in application No. PCT/US17/21663, dated Jun. 2017, 6 pages.

* cited by examiner

Fig. 2
(a)
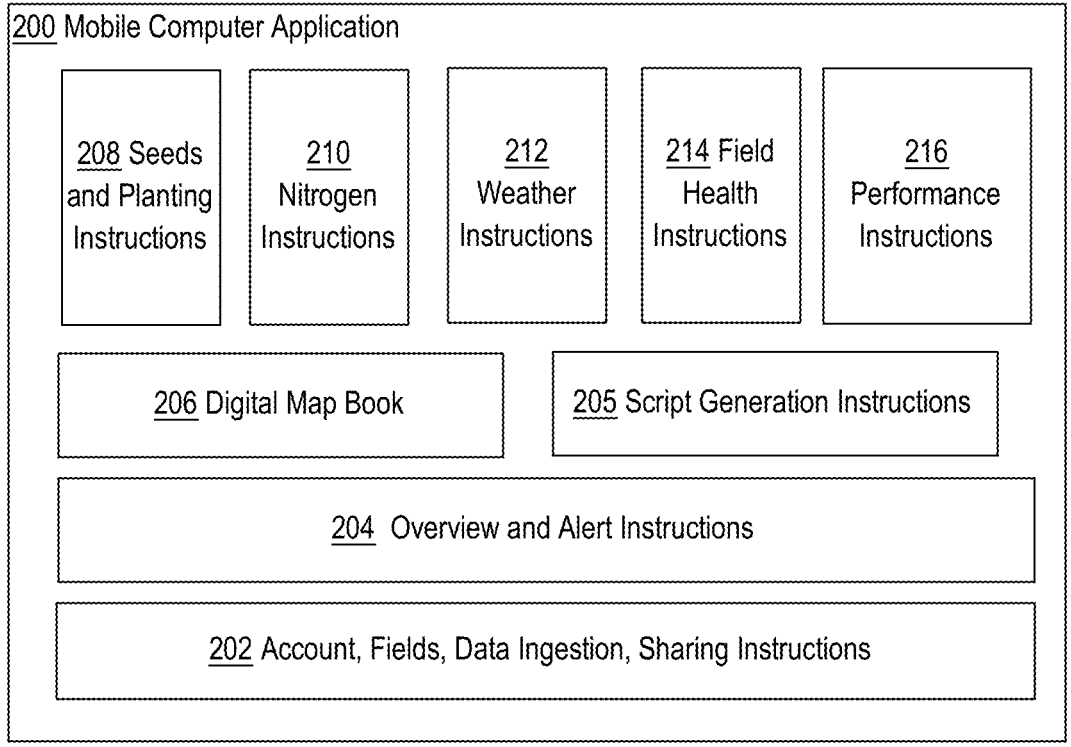
(b)
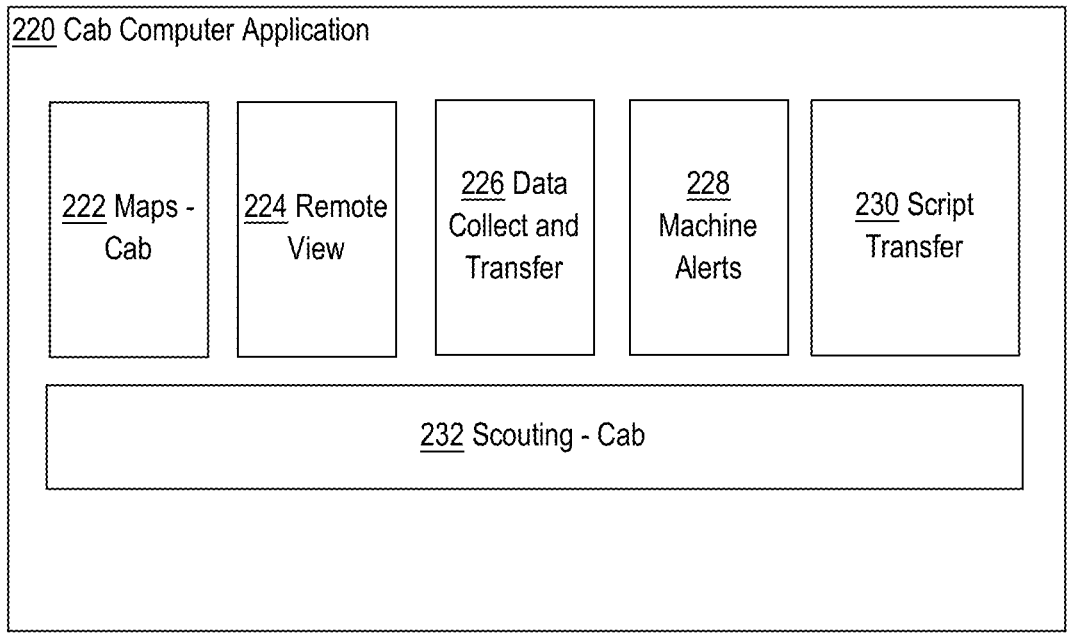

LONG-RANGE TEMPERATURE FORECASTING

BENEFIT CLAIM

This application claims the benefit under 35 U.S.C. § 120 as a Continuation of application Ser. No. 15/066,958, filed Mar. 10, 2016, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015 The Climate Corporation.

FIELD OF THE DISCLOSURE

The present disclosure relates to computer-based systems that are programmed for generating a long-range temperature forecast. More specifically, the present disclosure relates to using computer programs to generate a long-range temperature forecast or electronic digital data processing apparatus for generating a long-range temperature forecast.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Weather forecasting is the application of science, technology, and statistics to predict the state of the atmosphere for a given location at some future point in time. The endeavor to fully understand Earth's climate system and to predict the weather has been a goal of humanity for millennia. Weather forecasts are typically made by collecting quantitative data about the current state of the atmosphere at a given place and using the data to drive a simulation or physical model of the atmosphere to predict how the atmosphere will change over a given period of time. For example, identifying changes in environmental variables such as temperature, air currents, barometric pressure, moisture, and so forth.

The collection of the quantitative data is performed by using various tools, such as satellite image data, weather stations, temperature readings, humidity detectors, and so forth. Physical models used for weather forecasting decompose the earth (or other geographical region) into a uniform grid where the various environmental values are given a particular value at each location within the grid. The physical model then runs through the grid simulating the physical processes that cause changes in weather over time to reach a future predicted state. However, the base data collected from the various weather stations do not fully cover the grid, nor are the readings taken at uniform times or with tools that have identical measurement errors. In fact, in most cases there are far more points on the grid where the environmental variables are unknown than known. As a result, to convert the base observations into values for each point on the grid, a process known as data assimilation is performed which uses a combination of information from the gridded physical model with point observations to fill in the points where observations are not explicitly available. The result is a value for each of the environmental variables for each point in the grid, which is collectively referred to as an "analysis". The analysis is then used to set the initial state of the physical model simulation which is stepped forward in time to predict the weather at some future time. In some cases, a forecast model is also used to fill in the informational gaps, which is referred to as an analysis/forecast cycle. In essence, an initial condition is set by an analysis, a forecast is run from the analysis, and the forecast is then used to fill in or smooth out the gaps in the next analysis in a repeating cycle.

Since the initial condition of the atmosphere generated by the analysis is uncertain due to the observational data being incomplete, climate scientists will often run forecasts using a set of different initial states based on the known or estimated error of an analysis. The resulting forecasts, each representing the future state of the atmosphere assuming that the values of the environmental variables in the grid were in a slightly different initial state is referred to as a forecast ensemble. The overall behavior of the ensemble, rather than simply one forecast, is then used to better capture the uncertainty in the forecast.

In most cases, the analyses are performed by government agencies (and in some cases private agencies) and made freely available via various databases, for example the U.S. Climate Forecast System (CFS), the European Centre for Medium-Range Weather Forecasts (ECMWF), and so forth, provide open databases of analyses that can be accessed and analyzed by weather scientists. These organizations often provide analyses at different granularities of time, for instance six hours, daily, weekly, and so forth, as well as at different geographical granularities (for example different grid sizes).

Data assimilation techniques and forecasting models constantly evolve over time as atmospheric scientists develop a better understanding of the physical processes governing atmospheric evolution. As a result, if one were to view the analyses taken by various public and private organizations over an extended period of time (for example the last thirty-forty years), the changes in the data assimilation technique or forecasting model used can have a drastic impact on the analysis and the resulting forecast. To combat the non-uniformity of the techniques used to create the original analysis, climate monitoring organizations will often go back to the original observation data collected over a past period of time and apply a consistent data assimilation technique (usually one that is more up-to-date than the original technique) from that past period of time to the present. As a result, the inconsistencies are removed and the skill of forecasting models can be more easily evaluated. An analysis that is produced in this manner is referred to as a "reanalysis" since the data is being reanalyzed using a consistent technique.

Evaluating the skill of a forecast model requires a significant amount of forecasted predictions and corresponding observations with which to compare those predictions. However, when testing a new model, it is impractical to train on historical observation data and then evaluate at some point in the future based upon the analysis generated at that time. Especially for longer range forecasts, it might take over a month before a given forecast can be evaluated, and years or decades before enough data can be collected to tell whether the forecast model is actually skillful. As a result, climate scientists often perform "reforecasts", which is a forecast based on past analyses (or more preferably reanalyses). For example, if a reanalysis covers the past 30 years, a forecast model can be initialized from those conditions and used to produce simulated forecasts across the 30 year period. Thus, a reforecast provides evidence of what a forecast model would predict if it had been used to forecast environmental conditions at some previous point in time. As a result, the predictive skill of the forecast model can be evaluated at a variety of leads by comparing the predictions to the corresponding observed environmental conditions at that time.

SUMMARY OF THE DISCLOSURE

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

DETAILED DESCRIPTION

Figure 1:
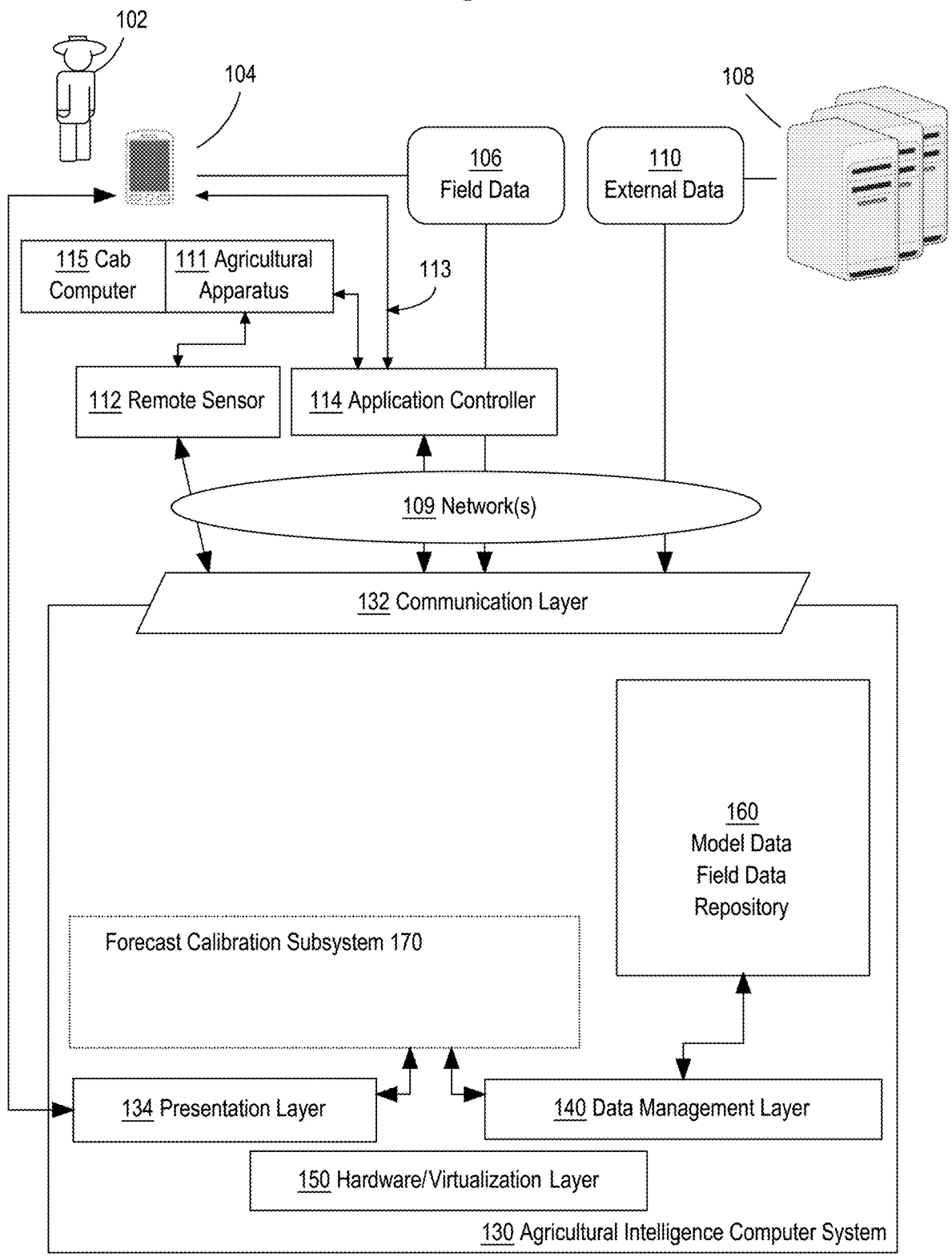
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:
  1.0 General Overview
  2.0 Example Agricultural Intelligence Computer System
    2.1 Structural Overview
    2.2 Application Program Overview
    2.3 Data Ingest to the Computer System
    2.4 Process Overview—Agronomic Model Training
    2.5 Forecast Calibration System
      2.5.1 Forecast Calibration System Structural Overview
      2.5.2 Forecast Calibration System Functional Overview
    2.6 Implementation Example—Hardware Overview
  3.0 Example System Inputs
  4.0 Climatology
  5.0 Nonhomogeneous Gaussian Regression
  6.0 Modified Nonhomogeneous Gaussian Regression
  7.0 Covariants
  8.0 Model Variants
  9.0 Calibration Training Process Flow
  10.0 Forecast Calibration Process Flow
  11.0 Analysis Triggers and Use Cases
  12.0 Extensions and Alternatives
  13.0 Additional Disclosure
  1.0 General Overview Aspects of the present disclosure relate to computer-based systems that are programmed for generating a long-range temperature forecast. More specifically, the present disclosure relates to using computer programs to generate a long-range temperature forecast or electronic digital data processing apparatus for generating a long-range temperature forecast.

In addition to error introduced by the data assimilation technique used to create the analyses/reanalyses, forecasting models are also imperfect at describing how the atmosphere evolves over time as a physical process. First, physical forecasting models generally tend to have inherent biases, such that the prediction of the environmental variables at a future time is, on average, higher or lower than observed. These biases frequently differ with the season, the time of day, the type of weather event, and the location. Second, forecast ensembles are underdispersive: ensemble generation techniques generally do not capture all of the uncertainty in the analysis or in the forecast model so that forecast ensembles are not diverse enough to properly represent the potential evolution of the real atmosphere. Techniques described herein relate to calibrating ensemble forecasts produced by a forecast model to correct for bias and underdispersion and therefore produce a better prediction of the future state of environmental variables, especially for longer ranged predictions with 14-45-day lead times. The examples described herein are primarily directed towards a forecast model that predicts two specific environmental variables, which are daily minimum and maximum temperature. However, the techniques described herein could be extended to any number of different environmental variables, such as dewpoint, relative humidity, precipitation, wind speed and direction, solar insolation, and so forth.

Temperature time series at a given location exhibit a diurnal cycle (day/night), a seasonal cycle (fall/winter/spring/summer), inter-annual variability (for example warmer than average summers, unusually long stretches without rain, and so forth), and long-term trends (for example from anthropogenic climate change), in addition to the strong variability associated with short-term weather phenomenon. Climatological conditions are those parts of this climate signal that repeat year after year in a reliable way, such as the seasonal cycle. Since temperatures over the last 30 years generally show a warming trend, forecasts can appear skillful simply by capturing the linear trend. In the approaches described herein, a climatology forecast is defined to include the repeating seasonal cycle and a linear trend over the past 30 years, and a skillful forecast is defined to be one that outperforms the aforementioned climatology.

In some embodiments, in order to simplify the climatology model, an assumption is made that all of the forecasting models output Gaussian temperature distributions parameterized by the univariate mean µ and the standard deviation σ. As a result, the overhead of dealing with large numbers of ensemble members is avoided, which makes generating and evaluating forecasts more efficient. In addition, forecasts are made for the average temperature for a given time period, rather than minimum and maximum temperature, reducing the number of environmental variables considered by the forecasts and eventual calibration. However, other embodiments may assume that the forecasting models output non-Gaussian temperature distributions and/or consider minimum and maximum temperature separately, rather than combined as average temperature.

In an embodiment, the method of calibrating a forecast is performed as follows. A climatology model is fit to a set of observations, such as reanalysis data which is assumed to be the base truth for the atmospheric conditions over the training period. For example, the climatology model may include a series of harmonics representing the various repeating cycles (such as diurnal cycle, inter-annual variability, and seasonal cycle) and a linear component representing the linear trend caused by anthropogenic climate change. The fitting may be done using any number of fitting techniques, such as using Nonhomogeneous Gaussian Regression (NGR) with the optimal model fit being determined by maximizing continuous ranked probability score (CRPS) by application of the Broyden-Fletcher-Goldfarb-Shanno algorithm. The climatology fitted to the observation data is referred to as the observation climatology. The observation climatology is then used to determine observed anomalies (observations—climatology), which represent deviations of observations from the typical temperature for a given time and location. For example, the deviations may represent warmer or colder temperatures than would be average for the given time and location.

The climatology model is then fitted using a set of reforecasts which correspond to the times and places of the observations that were generated based on a forecast model that is to be calibrated. The climatology fit with the reforecasts is referred to as the forecast climatology. The forecast climatology is then used to determine forecast anomalies (reforecasts—forecast climatology), which represents deviations of the forecast model from the climatological temperature for a given time and location. One advantage to computing climatologies and thereafter anomalies is that a high-resolution climatology can be developed using a high-resolution observational dataset, such as PRISM, and that information can be combined with forecast skill derived from a low-resolution forecast model.

The observed anomalies are then modeled as a function of the forecast anomalies at a variety of leads. The aforementioned function is referred to as the calibrating function. For example, the calibrating function may be generated by applying NGR using CRPS or log-likelihood as the objective function and a set of covariates representing features thought to be useful sources of forecasting skill, such as, for example, whether recent conditions were warmer or colder than typical and what the seasonal forecast model prediction is. Thus, given a forecast anomaly, the calibrating function returns a prediction of what the true anomaly should have been.

In an embodiment, given a new forecast from the forecast model, the forecast climatology can be used to calculate a forecast anomaly that corresponds to the new forecast. The forecast anomaly can then fed as input into the calibrating function to produce a calibrated anomaly which is an improved prediction of the deviation from climatological temperature. That calibrated anomaly is then added back to the observed climatology to obtain a calibrated forecast. Since the calibration mitigates the effect of biases and underdispersion inherent to the physical forecasting model used to product the forecast, a more accurate prediction for the average temperature can be achieved compared to using the raw output of the physical forecasting model.

Other features and aspect of the disclosure will become apparent in the drawings, description, and claims.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 9:
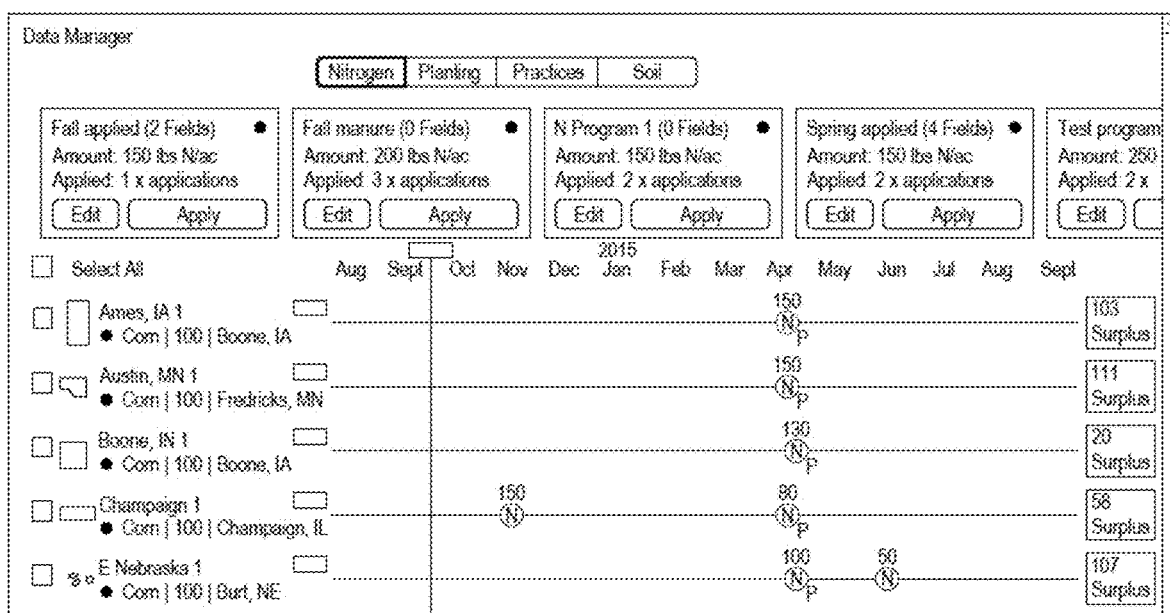
FIG. 9 depicts an example embodiment of a timeline view for data entry.

FIG. 9 depicts an example embodiment of a timeline view for data entry. Using the display depicted in FIG. 9, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 10, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 9, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 10, the interface may update to indicate that the "Fall applied" program is no longer being applied to the top field. While the nitrogen application in early April may remain, updates to the "Fall applied" program would not alter the April application of nitrogen.

Figure 6:
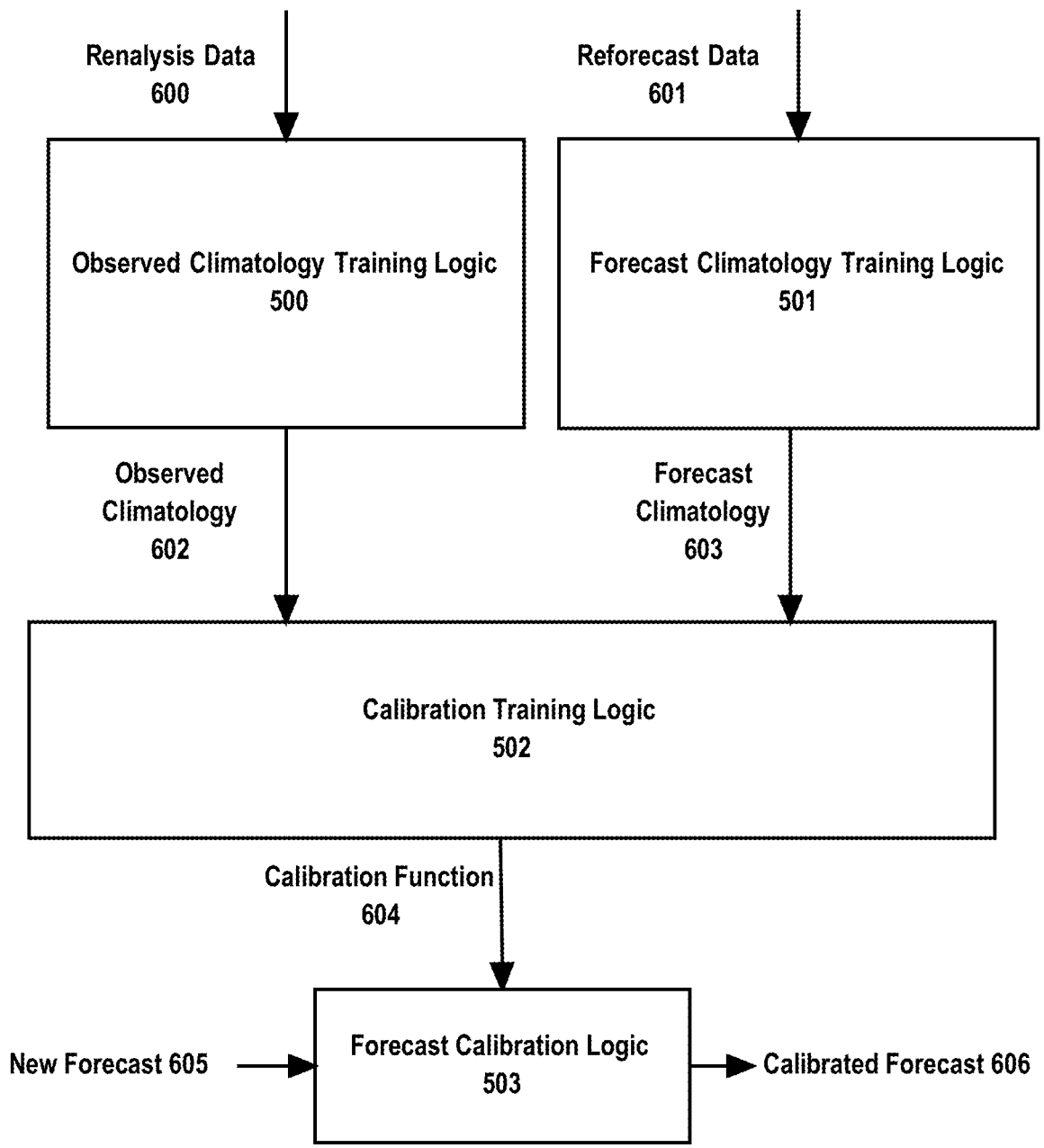
FIG. 6 illustrates a functional overview of a forecast calibration system according to an embodiment.
Figure 10:
FIG. 10 depicts an example embodiment of a spreadsheet view for data entry.

FIG. 10 depicts an example embodiment of a spreadsheet view for data entry. Using the display depicted in FIG. 10, a user can create and edit information for one or more fields. The data manager may include spreadsheets for inputting information with respect to Nitrogen, Planting, Practices, and Soil as depicted in FIG. 10. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
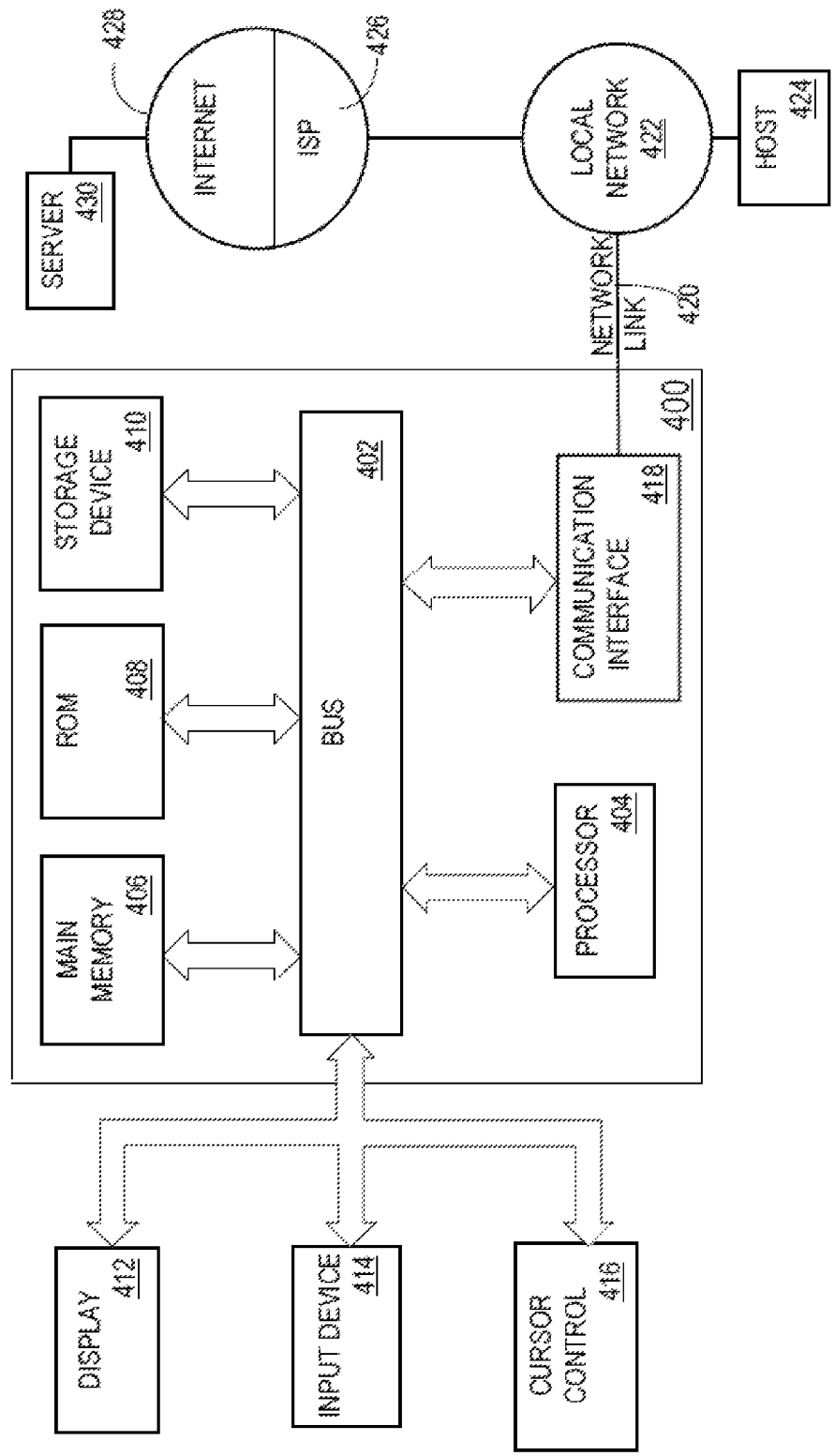
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
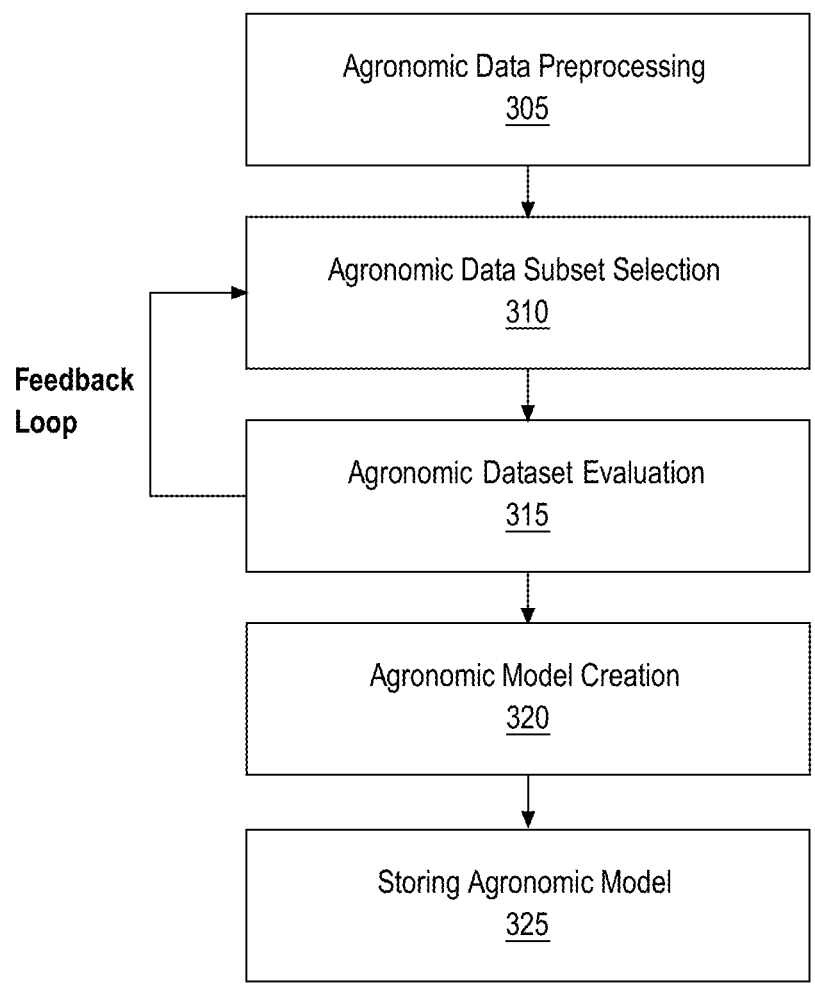
FIG. 3 illustrates a programmed process by which the agricultural intelligence computer system generates one or more preconfigured agronomic models using agronomic data provided by one or more external data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Forecast Calibration Subsystem

In an embodiment, the agricultural intelligence computer system 130, among other components, includes a forecast calibration subsystem 170. The forecast calibration subsystem 170 collects information related the "ground truth" of past environmental conditions, such as analyses/reanalyses, and predictions on past data produced by a forecast model, such as forecasts/reforecasts, and generates a calibration function that corrects the predictions of the forecast model. Thus, given a new forecast from the forecast model, that calibration function can then be used to calibrate the forecast to produce a more accurate prediction.

In an embodiment, the forecast calibration subsystem 170 is implemented via software, for example as programmed lines of codes written in languages such as C++, Java, Ruby, x86 assembly and so forth, via hardware, for example by application-specific integrated circuits (ASICs) field programmable gate arrays (FPGAs), general purpose hardware, and so forth, or via combinations of software and hardware components.

2.5.1 Forecast Calibration Subsystem Structural Overview

Figure 5:
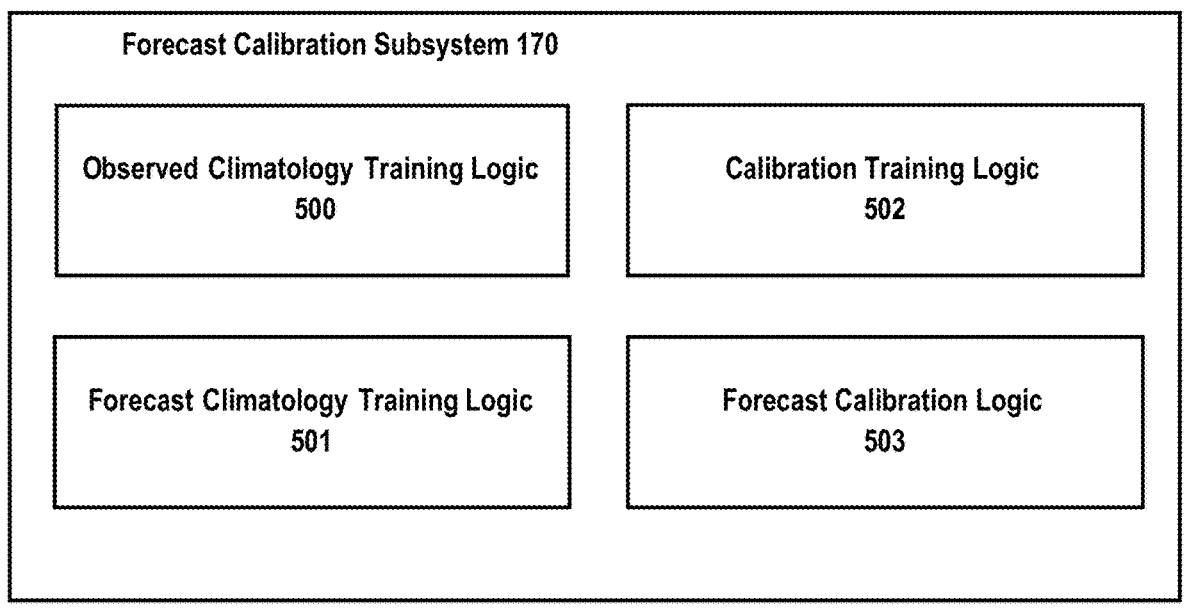
FIG. 5 illustrates a structural overview of a forecast calibration system according to an embodiment.

FIG. 5 illustrates an example structural overview for the forecast calibration subsystem 170 according to an embodiment. Although a particular number of components are depicted in FIG. 5, other embodiments may combine the functionality of components, divide out the functionality of components, include additional components, or remove components compared to the illustration of FIG. 5. Furthermore, the jobs of each of the components illustrated in FIG. 5 could be rearranged between the components. The components of FIG. 5 are referred to as "logic" components which may be implemented via software (for example as programmed lines of codes written in languages such as C++, Java, Ruby, x86 assembly, and so forth), via hardware (for example by application-specific integrated circuits (ASICs) field programmable gate arrays (FPGAs), general purpose hardware, and so forth), or via combinations of software and hardware components.

In FIG. 5, in an embodiment, the observed climatology training logic 500 represents logic that receives observation data and fits a climatology model to the observational data. For example, the observed climatology training logic 500 may be configured to retrieve reanalysis data from the model data and field data repository 160 and/or external data 110 that represents the "ground truth" state of the atmosphere at particular places and times. The observed climatology training logic 500 then uses the observation data to train/fit the climatology model. In the examples presented herein, the environmental variable considered is temperature, thus the observation data is assumed to represent temperatures for given times and locations, but other environmental variables may be considered in other embodiments. The climatology model itself is discussed in more detail below in Section 4.0. Once the climatology model has been fit to the observations, the result is a set of coefficients for the climatology model that can be used to, given a location/time, produce a climatological temperature for that location/time. The climatology model fit by the observed climatology training logic 500 is referred to as the observed climatology.

In an embodiment, the forecast climatology training logic 501 represents logic that receives reforecast data and fits a climatology model to the reforecast data. For example, the observed climatology training logic 500 may be configured to retrieve reforecast data from the model data and field data repository 160 and/or external data 110 that represents the predictions of a past state of the atmosphere at a particular time and place as determined by a forecast model. The forecast model that produced the reforecasts is the model whose predictions are ultimately calibrated by the techniques discussed herein. The forecast climatology training logic 501 then uses the reforecast data to train/fit the climatology model. Once the climatology model has been fit to the reforecasts, the result is a set of coefficients for the climatology model that can be used to, given a location/time, produce a climatological temperature for that location/time. The climatology model fit by the forecast climatology training logic 501 is referred to as the forecast climatology.

In an embodiment, the calibration training logic 502 represents logic that analyzes the observations and the reforecast data to generate a calibration function. In some embodiments, the calibration training logic 502 generates the calibration function by first computing observed anomalies (observations—observation climatology) and forecast anomalies (reforecasts—forecast climatology). The calibration training logic 502 then generates a calibration function that models the observed anomalies as a function of the forecast anomalies. For example, the calibration training logic 502 may use a Nonhomogeneous Gaussian Regression (NGR) technique as discussed in more detail below in Sections 5.0 and 6.0 to generate the calibration function. The generation of the calibration function represents the discovery of coefficients for various covariates considered by the regression. The covariates represent features of the observations and the forecast that are considered significant sources of predictability and/or important for determining cases where the predictions of the forecast model might be inaccurate.

In some embodiments, different calibration functions are produced for different leads. For example, each reforecast may include the temperature and variance for a specified location and time, as well as the lead time which represents how far the prediction is into the future from the initial state used by the forecast model. The calibration training logic 502 then generates different calibration functions for different lead times, for example, one for predictions with a lead time of 15 days, one for predictions with a lead time of 20 days, and so forth. Generating different calibration functions for different lead times is not strictly required, but may be helpful in some circumstances since different covariates may be preferred at different lead times. For example, the extent to which recent conditions were warmer or colder than typical (recent anomalies) may be a useful source of predictability for the first one to two weeks of forecasts, but may not be useful for forecasts at leads of three or four weeks. In this case, recent anomalies can be included as a covariate for modeling forecasts at leads of one to two weeks and not at leads of three to four weeks. However, for simplicity, the different calibration functions can be represented as a single calibration function that takes lead time as one of its inputs.

In an embodiment, the forecast calibration logic 503 represents logic that takes as input a new forecast and then uses the calibration function to calibrate the forecast. For example, the forecast calibration logic 503 may take the new forecast and use the forecast climatology to produce the climatological temperature for that location and time. The climatological temperature can then be subtracted from the new forecast to produce a forecast anomaly. The forecast anomaly is then fed as input to the calibration function to produce a calibrated anomaly, which in turn is added back to the climatological temperature to produce a calibrated forecast. Since the calibration will reduce the effect of the inherent biases and underdispersion of the forecast model and relies on other sources of predictability such as recent anomalies, the calibrated forecast will on average be more accurate than the raw forecast produced by the forecast model.

The term "new forecast" does not necessarily mean that the forecast is for a time into the future. In some cases, to test the effectiveness of the calibration, the "new forecast" may in fact be a reforecast for a time period that is not considered when training the calibration function. For example, the observations and the reforecasts may be divided into a training set and a testing set, as is common in cross-validation, where the calibration function is trained using the training set and the testing set is then used to verify the accuracy of the calibration. However, outside of testing, most cases will involve the receipt of a forecast into the future for which no observation is available and the calibration function is then used to calibrate the forecast to improve its accuracy.

2.5.2 Forecast Calibration Subsystem Functional Overview

FIG. 6 illustrates an example functional overview for the forecast calibration subsystem 170 according to an embodiment. Although the process flow illustrated in FIG. 6 depicts particular inputs and/or outputs among the components of FIG. 5, those inputs and outputs are not exclusive. In particular, to avoid obscuring the figure, inputs to components that are earlier in the chain are not explicitly shown as being available as input to components lower in the chain. However, in some embodiments, those inputs are in fact available to the later components. For example, the reanalysis data 600 and reforecast data 601 may be made available for use by the calibration training logic 502. Furthermore, the forecast climatology 603 may be available to the forecast calibration logic 503.

In FIG. 6, reanalysis data 600 is fed as input into the observed climatology training logic 500. The observed climatology training logic 500 then fits a climatology model to the reanalysis data 600 to produce observed climatology 602. Similarly, reforecast data 601 is fed as input into the forecast climatology training logic 501. The forecast climatology training logic 501 then fits the climatology model to the reforecast data 601 to produce a forecast climatology 603. The observed climatology 602 and the forecast climatology 603 are then used as input to the calibration training logic 502. The calibration training logic 502 calculates deviations from the climatology ("anomalies") for both the reanalysis data 600 and the reforecast data 601 and generates a calibration function 604 that models the observed anomalies as a function of the forecast anomalies. The calibration function 604 is then used by the forecast calibration logic 503 to calibrate a new forecast 605 resulting in calibrated forecast 606.

2.6 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3.0 Example System Inputs

In an embodiment, reanalysis data 600 represents a set of one or more reanalyses stored by the model data and field data repository 160 and/or external data 100 that is accessible to the forecast calibration subsystem 170. As discussed above, reanalyses are analyses that have been performed using a consistent data assimilation technique and/or forecasting model. For the purpose of training the calibration function 604, the reanalysis data 600 is assumed to represent the "ground truth" for what the temperature actually was for a given location and time. Thus, each entry of the reanalysis data 600 may include fields such as temperature, location (for example grid location or other coordinates), time, uncertainty (for example expressed in standard deviations assuming a Gaussian distribution), and so forth. The aforementioned fields are not exclusive since the examples provided herein calibrate predictions for temperature, but other environmental variables, such as moisture, barometric pressure, wind current velocities, and so forth could also be calibrated using the same calibration methodology. Unlike forecasts/reforecasts, reanalyses do not include lead times since they represent snapshots of the atmosphere at a given time and place, rather than a prediction for a future time. Although data pertaining to reanalysis is generally preferred for ground truth due to removing inconsistencies in the forecasting models and/or data assimilation techniques utilized to produce the analysis, raw analysis data may be used in some embodiments as the ground truth. However, in other embodiments reanalysis data 600 may be augmented or replaced with observations that are not derived from an analysis/reanalysis, but rather alternative datasets that reconstruct past conditions such as PRISM. Thus, reanalysis data 600 is merely an example of observations of which any type could be used for the same purposes described herein in relation to the reanalysis data 600.

In an embodiment, reforecast data 601 represents a set of one or more reforecasts stored by the model data and field data repository 160 and/or external data 100 that is accessible to the forecast calibration subsystem 170. As discussed above, reforecasts are forecasts generated by a forecast model that takes into account data only up to some point in the past and then forecasts ahead from that past point. Thus, the reforecast data 601 generally represents predictions for time periods when the ground truth is already available. Each entry of the reforecast data 601 may include fields such as temperature, location (for example grid location or other coordinates), time, uncertainty (for example expressed in standard deviations assuming a Gaussian distribution), lead time and so forth. Furthermore, the reforecast data 601 may include, for each location and time, a plurality of members that are collectively referred to as an ensemble. Each member of the ensemble is a forecast for the specified location and time assuming a different initial state, such as using different reanalysis to begin the simulation of the physical process or using the same reanalysis but using perturbations to its values based on the standard deviation of the environmental variables in the reanalysis.

In an embodiment, new forecast 605, like reforecast data 601, represents a prediction made by the underlying forecast model, but is for a future time for which no observation data (such as an analysis or reanalysis) is available. Thus, reforecast data 601 and reanalysis data 600 are used to develop a calibration function 604 based on discrepancies between the observed and predicted temperatures. The calibration function is then used to calibrate the new forecast 605 to improve the accuracy of the predictions. Furthermore, like reforecasts, the new forecast 605 may also include multiple ensemble members.

Reanalyses, reforecasts, and forecasts are produced by a number of weather monitoring organizations, such as the NCEP, the ECMWF, as well as others, and are readily available for download from their respective databases. Thus, in some embodiments, the reanalysis data 600, reforecast data 601, and new forecast 605 may be obtained by the agricultural intelligence computer system 130 from external data 110 representing the databases maintained by the aforementioned weather monitoring organizations. In other embodiments, the agricultural intelligence computer system 130 may be configured to generate its own reanalyses to store in the model data and field data repository 160 or periodically download the latest data from the databases belonging to the aforementioned weather monitoring organizations into the model data and field data repository 160.

The different datasets produced by the weather monitoring organizations may be generated for different geographic granularities (for example different grid sizes), be produced at different temporal granularities (for example time steps of different amounts of time, such as producing an analysis/reanalysis every 6 hours, while others produce a reanalysis in time steps of a day), and so forth. Thus, for example, if the reanalysis data from one organization is used as the ground truth data, but the reforecast data is from a different organization that used different geological and/or temporal granularities, smoothing and/or subsampling may be performed so that the resolutions of the observations and predictions match to simplify the calibration process. Further, some datasets may include low and high temperature, rather than average temperature which is the environmental variable analyzed in the examples contained herein. However, the high and low temperature in those datasets can be averaged together to approximate the average temperature for the corresponding location and time.

4.0 Climatology

In an embodiment, the univariate mean, $\mu(t)$, and standard deviation, $\sigma(t)$, at each physical location are modeled as functions of time, t, and are used to define a climatology, which includes the repeating seasonal cycle and linear climate trends. Thus, the climatology model includes as covariates a combination of a linear trend $ct+d$ and a series of $k=3$ harmonics (Equation 1.0):

$$\mu(t) = \sum_{i=1}^{k} \left(a_i \sin\left(\frac{it}{T}\right) + b_i \cos\left(\frac{it}{T}\right)\right) + ct + d$$

where $\mu(t)$ is the climatological mean for a given location and time t, variables a, b, c, and d are fit parameters, and T represents the time period for cyclic components (for example a year). The climatological variance $\sigma_t^2$ is modeled without trending and using only one harmonic (Equation 2.0):

$$\sigma(t) = e\sin\left(\frac{t}{T}\right) + f\cos\left(\frac{t}{T}\right) + g$$

where e, f, and g are fit parameters.

To generate statistical ensembles at each location and time from the climatology model, the temperatures of each day $T_i$ are drawn from the equivalent climatological distribution: $T_i \sim N(\mu(t), \sigma(t)^2)$ where N indicates a Gaussian distribution.

5.0 NONHOMOGENOUS GAUSSIAN REGRESSION

Nonhomogeneous Gaussian Regression (NGR), also known as Ensemble Model Output Statistics (EMOS), is a method of post processing ensemble forecasts with the goals of removing bias and improving the ensemble dispersion. NGR is a simple extension of the generalized linear model used for climatology in which the resulting forecast distribution $Y_t$ is allowed to be a function of the ensemble forecasts $F_t$:

$$Y_t \sim N(\mu(t, F_t), \sigma(t, F_t)^2)$$

$\mu(t, F_t)$ and $\sigma(t, F_t)$ may be defined as linear functions of the ensemble mean and sample standard deviation, $s(F_t)$, $$\mu(t) = \alpha_0 + \alpha_1 F_t$$

$$\sigma(t) = \beta_0 + \beta_1 s(F_t)$$

but the aforementioned definition can be extended to include multiple predictors/covariates $X_{\mu,t}$ and $X_{\sigma,t}$, such that the resulting calibrated distribution at time t is, $$Y_t \sim N(\alpha^T X_{\mu,t}, (\beta^T X_{\sigma,t})^2)$$

In an embodiment, the climatology model described above (0127) uses the following covariates:

$$X_{\mu,t} = \begin{bmatrix} 1 \\ t \\ \sin\left(\frac{t}{i}\right) \\ \vdots \\ \cos\left(\frac{3t}{i}\right) \end{bmatrix} \text{ and } X_{\sigma,t} = \begin{bmatrix} 1 \\ \sin\left(\frac{t}{i}\right) \\ \cos\left(\frac{t}{i}\right) \end{bmatrix}.$$

There are many different sets of covariates that may be used for the univariate mean and standard deviation. Other sets of potential covariates that could be used for $X_{\mu,t}$ and $X_{\sigma,t}$ are described below in Section 8.0.

The goal of the calibration training logic 502 is to find optimal values for the covariate weights, $\alpha$ and $\beta$. There are multiple potential objective functions that could be used to determine the covariate weights, such as minimizing the continuous ranked probability score (CRPS) or maximizing the log-likelihood. However, to provide a concrete example, an embodiment that utilizes CRPS is described.

Given a set of observations Z, reforecasts F, and parameters $\alpha$ and $\beta$, the CRPS can be computed as follows (Equation 3.0), $$CRPS(Z_t) = \sigma_t \left(\frac{Z_t - \mu_t}{\sigma_t} \left(2\Phi\left(\frac{Z_t - \mu_t}{\sigma_t}\right) - 1\right) + 2\phi\left(\frac{Z_t - \mu_t}{\sigma_t}\right) - \frac{1}{\pi}\right).$$

where $\mu_t = \alpha^T X_{\mu,t}$ and $\sigma_t = \beta^T X_{\sigma,t}$. Finding the optimal weights that minimizes the average CRPS of the calibrated forecasts is efficient since the gradient can be computed relatively quickly by a conventional Central Processing Unit (CPU):

$$\frac{\partial CRPS}{\partial \mu_t} = 1 - 2\Phi\left(\frac{Z_t - \mu_t}{\sigma_t}\right)$$

$$\frac{\partial CRPS}{\partial \sigma_t} = 2\phi\left(\frac{Z_t - \mu_t}{\sigma_t}\right) - \frac{1}{\pi}.$$

For example, the optimization may be performed using the Broyden-Fletcher-Goldfarb-Shanno algorithm, which uses an empirical approximation of the Hessian that is refined iteratively.

6.0 Modified Nonhomogenous Gaussian Regression

In an embodiment, the NGR methodology described above in Section 5.0 is modified to calibrate anomalies relative to climatology, rather than calibrating temperatures directly. For example, the aforementioned approach allows a high-resolution climatology model to be built using high-resolution gridded reconstruction of past conditions (such as PRISM data) and combine that with forecast skill obtained from a low-resolution forecast model. First the observed temperature anomalies are computed (Equation 4.0):

$$A_t = \frac{T_t - \mu_t}{\sigma_t},$$

where $\mu_t$ and $\sigma_t$ are the mean and standard deviation of the observed climatology 602 at time t, as described above in Section 4.0, and $T_t$ represents the observed temperature at time t, such as indicated by the reanalysis data 600. In addition, the climatology is fit to the reforecasts and used to determine forecast anomalies (Equation 5.0), $$FA_t = \frac{F_t - \mu_t^{Forecast}}{\sigma_t^{Fforecast}}$$

where the values $\mu_t^{Forecast}$ and $\sigma_t^{Forecast}$ are the mean and standard deviation of the forecast climatology 603 at time t and $F_t$ is the temperature at time t as indicated by the forecast, such as indicated by the reforecast data 601.

In an embodiment, NGR, such as described above in Section 5.0, is then used to model the calibrated forecast anomalies $C_t$, $$C_t \sim N(\mu(t, FA_t), \sigma(t, FA_t)^2).$$

The calibrated forecast anomalies can then be added back to the observed climatology 603 to arrive at the calibrated forecast temperature distribution (Equation 6.0), $$Y_t = \sigma_t C_t + \mu_t.$$

Using this reformulation, the intuitive property is gained that when $\mu(t, FA_t) = 0$ and $\sigma(t, FA_t) = 1$ the calibrated forecasts exactly equal the forecast climatology 603. Positive values in $\alpha$ indicate that the corresponding covariate is positively correlated with warmer than normal temperatures, as well as the converse.

7.0 Covariates

This section describes various sets of covariates of $\mu$ and $\sigma$ which can be used for the covariate matrices $X_{\mu,t}$ and $X_{\sigma,t}$ described above in Section 5.0. A forecast $F_t$ for some t may consist of several ensemble members. Ensemble member i is noted with an additional subscript $F_{t,i}$ and the forecast lead time in days is indicated with an l such that $F_{t,i,l}$ is forecast member i valid at t that is l days old.

The ensemble mean and ensemble standard deviation are written as:

$$EnsembleMean_{t,l} = \frac{1}{k}\sum_i^k F_{t,i,l}$$
$$= \overline{F_{t,i,l}}$$
$$EnsembleSD_{t,l} = \frac{1}{k}\sum_i^k (F_{t,i,l} - \overline{F_{t,i,l}})^2$$
$$= s(F_{t,i,l}).$$

For subseasonal and longer lead times (for example in the 15-45 range), it is not expected for the model to have any skill in forecasting specific weather events. Instead, the purpose of the model is to provide information about longer-term shifts from climatology, such as prolonged warming events. However, each ensemble member forecasts a specific progression of weather events. Ideally, there would be hundreds if not thousands of ensemble members to average out the weather events and allow for subtle deviations from climatology to be identified. However, not all data sets have a large enough ensemble sets or true ensemble members that could be used for this purpose. Thus, in some embodiments, two additional covariates based on augmented and smoothed ensembles can be added to the model to compensate, which include forecasts from neighboring run times and lead times.

Augmented ensembles are produced by including forecasts from older run times, thus trading off forecast accuracy (which is best at the shortest possible lead), for a reduction in weather noise. For example, a forecast for January 30$^{th}$ with a lead of 30 days may consist of forecasts issued on January 30$^{th}$, but could also include forecasts from December 27$^{th}$, December 22$^{nd}$, and so on. An augmented mean and standard deviation can then be computed which includes the last p leads:

$$AugmentedMean(p)_{t,l} = \frac{1}{kp}\sum_j^p \sum_i^k F_{t,i,l+j}$$
$$= \overline{F_{t,i,l:l+p}}$$
$$AugmentedSD(p)_{t,l} = \frac{1}{kp}\sum_j^p \sum_i^k (F_{t,i,l+j} - \overline{F_{t,i,l:l+p}})^2.$$

As an alternative smoothing approach, smoothed ensembles incorporate forecasts from neighboring lead times instead of older run times. For example, a forecast for the third of January can include the ensembles for the second and first. The resulting covariates are referred to as the smooth mean and standard deviation, which are derived from an ensemble set which includes the last p valid times, $$SmoothMean(p)_{t,l} = \frac{1}{kp}\sum_j^p \sum_i^k F_{t-j,i,l}$$
$$= \overline{F_{t-p:i,l}}$$
$$SmoothSD(p)_{t,l} = \frac{1}{kp}\sum_j^p \sum_i^k (F_{t-j,i,l} - \overline{F_{t-p:i,l}})^2.$$

Since temperature time series have significant autocorrelation, covariates based on persistence, that recent anomalies persist in time, can also be used in some embodiments. Using the same notation, two additional covariates that capture the most recent anomaly as well as an average of the p most recent anomalies are:

$$RecentAnomaly_{t,l} = A_{t-l}$$
$$SmoothAnomaly(p)_{t,l} = \frac{1}{p}\sum_i^p A_{t-l-i}.$$

8.0 Model Variants

From the covariates described above in Section 7.0, a multitude of different models can be constructed.

The first example model is referred to as the NGR model and consists of the covariants, $$X_{\mu,t} = \begin{bmatrix} 1 \\ \sin\left(\frac{t}{l}\right) \\ \cos\left(\frac{t}{l}\right) \\ EnsembleMean \\ AugmentedMean_{(4)} \\ SmoothMean_{(30)} \end{bmatrix} \text{ and } X_{\sigma,t} = \begin{bmatrix} 1 \\ \sin\left(\frac{t}{l}\right) \\ \cos\left(\frac{t}{l}\right) \\ EnsembleSD \\ AugmentedSD_{(4)} \\ SmoothSD_{(30)} \end{bmatrix}.$$

This models the mean and standard deviation as a function of the time of the year and the current forecasts. Seasonal harmonics are included because physical models often have seasonally-dependent biases.

The second example model is referred to as the Persistence model and uses only seasonal bias and the most recent anomalies as covariants, $$X_{\mu,t} = \begin{bmatrix} 1 \\ \sin\left(\frac{t}{i}\right) \\ \cos\left(\frac{t}{i}\right) \\ RecentAnomaly \\ SmoothAnomaly_{(30)} \end{bmatrix} \text{ and } X_{\sigma,t} = \begin{bmatrix} 1 \\ \sin\left(\frac{t}{i}\right) \\ \cos\left(\frac{t}{i}\right) \end{bmatrix}.$$

This model has more knowledge of current climate conditions than climatology, but, unlike dynamically based forecasts, has no knowledge about the evolution of weather patterns.

A third example model is a hybrid between the NGR and Persistence models that contains all the covariates:

$$X_{\mu,t} = \begin{bmatrix} 1 \\ \sin\left(\frac{t}{i}\right) \\ \cos\left(\frac{t}{i}\right) \\ EnsembleMean \\ AugmentedMean_{(4)} \\ SmoothMean_{(30)} \\ RecentAnomaly \\ SmoothAnomaly_{(30)} \end{bmatrix} \text{ and } X_{\sigma,t} = \begin{bmatrix} 1 \\ \sin\left(\frac{t}{i}\right) \\ \cos\left(\frac{t}{i}\right) \\ EnsembleSD \\ AugmentedSD_{(4)} \\ SmoothSD_{(30)} \end{bmatrix}.$$

9.0 Calibration Training Process Flow

Figure 7:
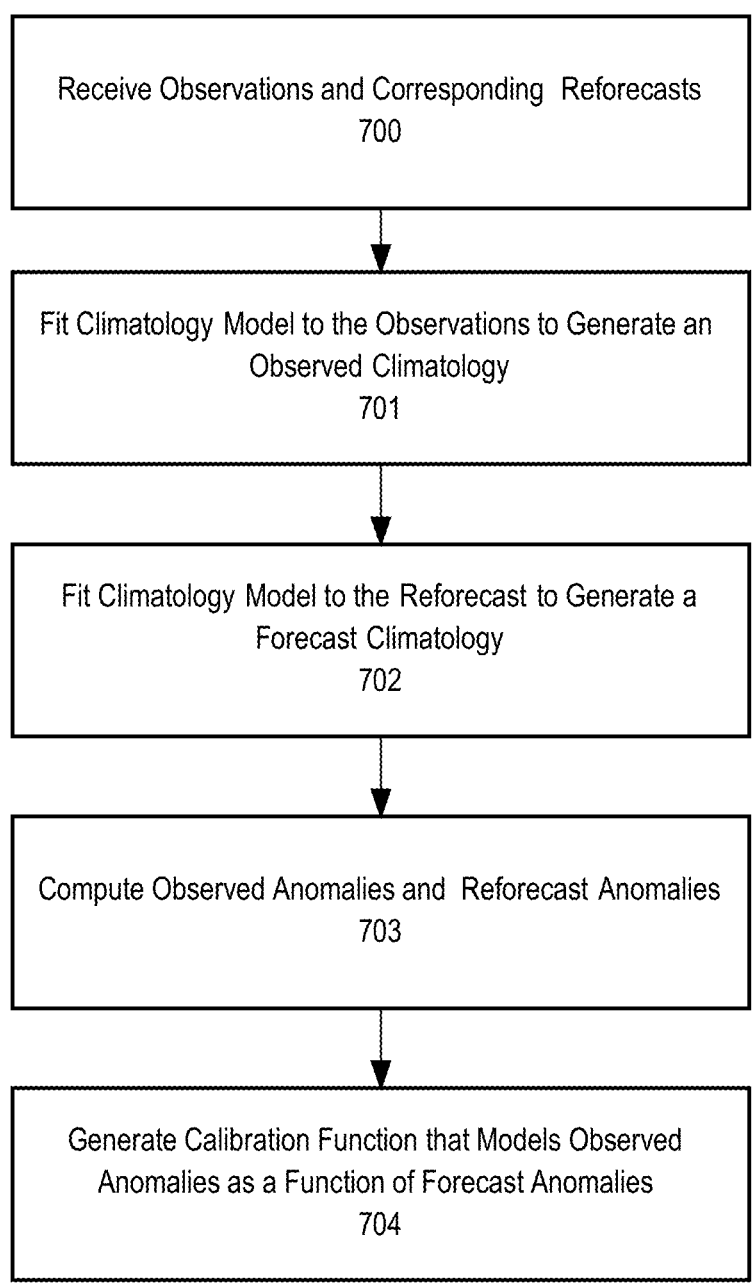
FIG. 7 illustrates a process for generating a calibration function for a forecast model according to an embodiment.

FIG. 7 illustrates an example process flow for training a calibration function for a forecast model according to an embodiment. Although FIG. 7 depicts a specific number of steps that are performed in a particular order, the exact order in which the steps are depicted is not critical and may vary between implementations. In other embodiments, the steps depicted may be broken down into multiple sub-steps, combined into more generalized steps, include additional steps, or lack particular steps compared to FIG. 7. In the examples below, the components of the forecast calibration subsystem 170 are assumed to perform the steps. In addition, the "ground truth" observations are assumed to be the reanalysis data 600 and the predictions from the forecast model used to train the calibration are assumed to be the reforecast data 601. However, as mentioned above, reanalysis data 600 is merely an example of observations that can be used, any other gridded reconstruction of past conditions could also be utilized.

In FIG. 7, at block 700 the forecast calibration subsystem 170 receives a set of observations and a set of corresponding forecasts generated by a forecast model. For example, the set of observations may be represented by the reanalysis data 600 which provides temperatures for particular times and places. The set of corresponding forecasts may be represented by the reforecast data 601 which includes ensemble members, each of which provides a prediction of the temperatures that correspond to the same times and places as the members of the reanalysis data 600. Thus, in this example, the reanalysis data 600 represents the base truth for temperatures at a given time and place and the reforecast data 601 represents the corresponding temperatures produced based on the forecast model. As discussed above, in some embodiments, the reforecast data 601 may include multiple ensemble members for a given time and place, representing the temperature values produced by the forecast model assuming different initial states. In an embodiment, block 700 is performed by the observed climatology training logic 500 and the forecast climatology training logic 501 which obtain the reanalysis data 600 and the reforecast data 601 respectively. For example, as described above in Section 3.0, the reanalysis data 600 and the reforecast data 601 may be obtained from the model data and field data repository 160, external data 110, or a combination of both.

At block 701, the observed climatology training logic 500 fits a climatology model to the observations to generate an observed climatology 602. In an embodiment, the observed climatology training logic 500 uses the reanalysis data 600 to fit the climatology discussed above with respect to Equation 1.0 and Equation 2.0 in Section 5.0 to generate the observed climatology 602. The observed climatology 602, for a given place and time, provides a value for the average temperature that is expected based on the observations along with the corresponding variance. The observed climatology 602 is then provided to the calibration training logic 502.

At block 702, the forecast climatology training logic 501 fits the climatology model to the reforecasts to generate a forecast climatology 603. In an embodiment, the forecast climatology training logic 501 uses the reforecast data 601 to fit the climatology discussed above with respect to Equation 1.0 and Equation 2.0 in Section 5.0 to generate the forecast climatology 603. The forecast climatology 603, for a given place and time, provides a value for the average temperature expected by the forecast model along with the corresponding variance. The forecast climatology 603 is then provided to the calibration training logic 502.

At block 703, the calibration training logic 502 computes observed anomalies and forecast anomalies. In an embodiment, the calibration training logic 502 computes observed anomalies by subtracting the observations from the observed climatology 602 as explained above in Section 6.0 in reference to Equation 4.0 of Section 6.0. In addition, the calibration training logic 502 computes forecast anomalies by subtracting the forecasts from the forecast climatology 603 as explained above in Section 6.0 in reference to Equation 5.0 of Section 6.0.

At block 704, the calibration training logic 502 generates a calibration function 604 by modeling the observed anomalies as a function of the forecast anomalies. In an embodiment, the calibration training logic 502 is generated by applying NGR as discussed above in Section 5.0, using the observed anomalies as Z and the forecast anomalies as F in Equation 3.0. The result is a set of covariant weights a and for the covariates $X_{\mu,t}$ and $X_{\sigma,t}$, such that a forecast anomaly can be fed as input to the calibration function 604 to calibrate the forecast anomaly and its corresponding variance. Examples of covariates that can be used for $X_{\mu,t}$ and $X_{\sigma,t}$ are discussed above in Section 7.0 and Section 8.0.

10.0 Forecast Calibration Process Flow

Figure 8:
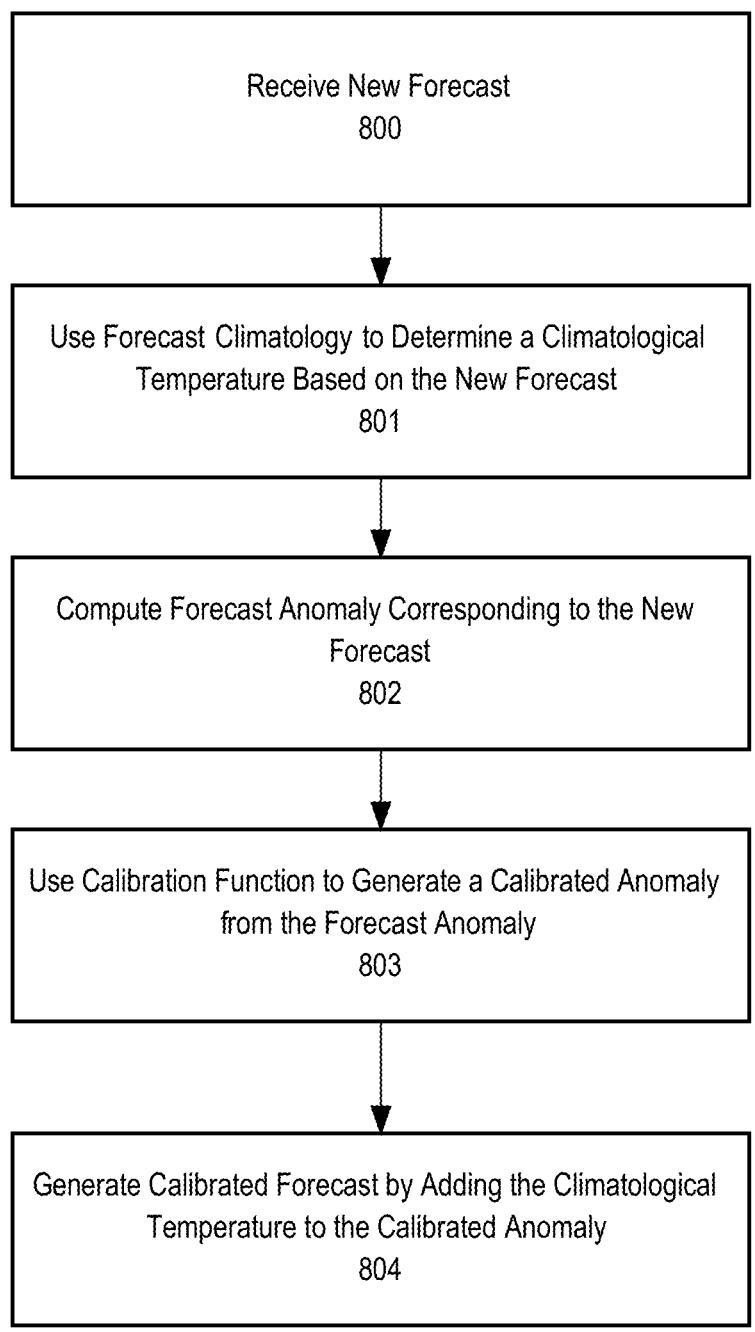
FIG. 8 illustrates a process for calibrating a new forecast according to an embodiment.

FIG. 8 illustrates an example process flow for training a calibration function for a forecast model according to an embodiment. Although FIG. 8 depicts a specific number of steps that are performed in a particular order, the exact order in which the steps are depicted is not critical and may vary between implementations. In other embodiments, the steps depicted may be broken down into multiple sub-steps, combined into more generalized steps, include additional steps, or lack particular steps compared to FIG. 8. The steps of FIG. 8 are assumed in the following examples to be performed by the forecast calibration logic 503. Furthermore, the new forecast 605 is assumed to be the forecast that will be calibrated by the calibration function 604.

In FIG. 8, at block 800, the forecast calibration logic 503 receives a new forecast 605 to calibrate. In some embodiments, as discussed above in Section 3.0, the new forecast 605 is obtained from the model data and field data repository 160, external data 110, or a combination of both. Furthermore, in some embodiments, the new forecast 605 is one member of a larger dataset, representing forecasts for various places, times, and leads. To calibrate multiple members of the dataset, the steps of FIG. 8 may be repeated for each member.

At block 801, the forecast calibration logic 503 computes a forecast anomaly based on the new forecast 605. In an embodiment, the forecast calibration logic 503 uses the forecast climatology 603 to compute a climatological temperature for the place and time of the new forecast 605 and its corresponding variance. The climatological temperature and its variance are then subtracted from climatology as explained above in Section 6.0 in reference to Equation 5.0 to produce a forecast anomaly.

At block 802, the forecast calibration logic 503 feeds the forecast anomaly as input to the calibration function 604 to produce a calibrated anomaly. In an embodiment, the calibration function 604 produced by step 704 of FIG. 7 is fed the forecast anomaly produced at block 801 to return a calibrated forecast anomaly and its corresponding variance.

At block 803, the forecast anomaly is added back to the climatological temperature to produce a calibrated forecast 606. In an embodiment, the calibrated forecast anomaly is added back to the climatological temperature based on the observed climatology 602 to generate the calibrated forecast 606. For example, a climatological temperature can be produced based on the observed climatology 602 for the same date/time of the forecast being calibrated, this climatological temperature is then adjusted by adding the calibrated forecast anomaly.

11.0 Analysis Triggers And Use Cases

In some embodiments, the generation of the calibration function 604 and the calibration of the new forecast 605 are performed automatically by the agricultural intelligence computer system 130. For example, the agricultural intelligence computer system 130 may collect user input (for example through one or more user interfaces of the agricultural intelligence computer system 130 and/or cab computer 115) identifying an observation dataset representing the ground truth (for example by specifying a uniform resource locater (URL) or other identifier), a reforecast dataset representing past predictions produced by a forecast model, and a forecast dataset representing future predictions produced by the forecast model. In some embodiments, the agricultural intelligence computer system 130, in response to receiving the user input, invokes the forecast calibration subsystem 170 to generate the calibration function 604 based on the observation dataset and the reforecast dataset (for example according to FIG. 7 above) and caches the calibration function 604 in the model data and field data repository 160. After the calibration function 604 is cached, the forecast calibration subsystem 170 uses the cached calibration function 604 to produce a calibrated forecast dataset, such as described above in relation to FIG. 8. The calibrated forecast dataset can then be stored in the model data and field data repository 160 for further analysis or caused to be displayed in a user interface shown on the agricultural intelligence computer system 130, cab computer 115, or another device.

In some embodiments, the agricultural intelligence computer system 130 is configured to periodically pull data from the data source of the forecast dataset and automatically calibrates any newly discovered forecasts using the cached calibration function 604 and adds the result to the calibrated forecast dataset. However, in some embodiments, the agricultural intelligence computer system 130 may periodically regenerate the calibration function 604 based on updates to the reforecast dataset that may be made available by the data source. For example, the calibration function 604 may be retrained each time a new update is discovered, once every set period of time, in response to user input specifying to retrain the calibration function 604, and so forth.

The calibrated forecast dataset can be used to enhance the predictions for weather, such as identifying periods of hotter or colder than average temperatures. However, there are also other applications that can be built up from the calibrated forecasts. For example, Weather Index Insurance (WII) identifies conditions which are known to likely result in specific amounts of loss of crop yield. Thus, instead of sending out an inspector to identify actual loss of crop yield, instead the WII pays out on the policy if any of those conditions are met based on the predicted loss in crop yield. In other to set the policies, the calibrated forecast dataset can be used to identify periods of hotter or colder than average temperatures which may adversely affect crop yield. Furthermore, in addition to WII, knowing which time periods are likely to produce abnormal weather also helps identify what types of crops a farmer should plant and at what time. For example, if the temperature is expected to be significantly hotter than usual during a critical part of the growth cycle of the planted crop, the farmer may decide ahead of time to plant a type of crop or strain that is more resistant to hotter temperatures. Furthermore, in some cases a farmer may opt to plant sooner rather than later to avoid a period of abnormal weather that is predicted to appear over a month into the future. As another example, the techniques described herein can be applied to decision making around pest and disease control. If the season is predicted to be hotter or cooler than normal, a grower might elect to protect against pests and diseases that thrive in the predicted conditions.

12.0 Extensions And Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

13.0 Additional Disclosure

Aspects of the subject matter described herein are set out in the following numbered clauses:

1. A method comprising: an agricultural intelligence computer receiving an observation dataset that identifies one or more ground truth values for an environmental variable at one or more times and a reforecast dataset that identifies one or more predicted values for the environmental variable produced by a forecast model that correspond to the one or more times; the agricultural intelligence computer training a climatology on the observation dataset to generate an observed climatology; the agricultural intelligence computer training the climatology on the reforecast dataset to generate a forecast climatology; the agricultural intelligence computer identifying observed anomalies based on the observed climatology and the observation dataset; the agricultural intelligence computer identifying forecast anomalies based on the forecast climatology and the reforecast dataset; the agricultural intelligence computer modeling the observed anomalies as a function of the forecast anomalies to generate a calibration function; the agricultural intelligence computer receiving a new forecast produced by the forecast model; the agricultural intelligence computer calibrating the new forecast using the calibration function.

2. The method of Clause 1, wherein the reforecast dataset represents predictions produced by the forecast model for one or more past times and the new forecast is a prediction produced by the forecast model for a future time.

3. The method of any of Clauses 1-2, wherein the environmental variable relates to temperature.

4. The method of Clause 3, wherein the environmental variable is average temperature and the climatology models' climatological average temperature.

5. The method of any of Clauses 1-4, wherein modeling the observed anomalies as a function of the forecast anomalies is performed using Nonhomogeneous Gaussian Regression.

6. The method of Clause 5, wherein the Nonhomogeneous Gaussian Regression uses minimizing continuous ranked probability score or maximizing log-likelihood as an objective function.

7. The method of any of Clauses 5-6, wherein the Nonhomogeneous Gaussian Regression uses one or more covariants representing one or more of: seasonal bias, ensemble mean, ensemble standard deviation, recent anomalies, forecasts from previous run times, or forecasts at other lead times.

8. The method of any of Clauses 1-7, wherein the observed dataset includes a value and a variance for the environmental variable at the one or more times and the reforecast dataset includes a value, a lead time, and a variance for the environmental variable at the one or more times.

9. The method of any of Clauses 1-8, wherein calibrating the new forecast using the calibration function is performed by: using the new forecast as input to the forecast climatology to obtain a forecast climatological value; computing a forecast anomaly based on the forecast climatological value and the new forecast; using the forecast anomaly as input to the calibration function to generate a calibrated forecast anomaly; generating an observational climatological value based on a time of prediction of the new forecast using the observed climatology; adding the forecast anomaly to the observational climatological value to generate the calibrated forecast.

10. The method of Clause 9, wherein the calibration function takes as input the value for the forecast anomaly, a variance for the forecast anomaly, and a lead time for the new forecast and produces a calibrated value for the forecast anomaly and a calibrated variance for the forecast anomaly based on the lead time.

11. One or more non-transitory computer-readable media storing instructions that, when executed by one or more computing devices, causes performance of any one of the methods recited in Clauses 1-10.

12. A system comprising one or more computing devices comprising components, implemented at least partially by computing hardware, configured to implement the steps of any one of the methods recited in Clauses 1-10.

What is claimed is:

1. A method for providing an improvement in long-range temperature forecasting using agricultural applications, the method comprising:

an agricultural intelligence computer receiving an observation dataset that identifies at least a forecast climatology model;
the agricultural intelligence computer training a climatology model on the observation dataset to generate an observed climatology model;
wherein the climatology model includes as covariates a combination of a linear trend and a series of harmonics;
the agricultural intelligence computer identifying observed anomalies based on the climatology model and the observation dataset;
the agricultural intelligence computer identifying forecast anomalies based on at least he forecast climatology model;
the agricultural intelligence computer modeling the observed anomalies as a function of the forecast anomalies to generate a calibration function that is used to correct the forecast climatology model based on the observed anomalies;
the agricultural intelligence computer, upon receiving a new forecast produced by the forecast climatology model, calibrating the new forecast using the calibration function.

2. The method of claim 1, wherein the forecast anomalies are further identified based on a reforecast dataset that represents predictions produced by a forecast model for one or more past times and the new forecast is a prediction produced by the forecast model for a future time.

3. The method of claim 2, wherein the observation dataset further identifies values for an environmental variable that relates to temperature.

4. The method of claim 3, wherein the environmental variable is average temperature and a climatology model climatological average temperature.

5. The method of claim 1, wherein modeling the observed anomalies as a function of the forecast anomalies is performed using Nonhomogeneous Gaussian Regression.

6. The method of claim 5, wherein the Nonhomogeneous Gaussian Regression uses minimizing continuous ranked probability score or maximizing log-likelihood as an objective function.

7. The method of claim 5, wherein the Nonhomogeneous Gaussian Regression uses one or more covariants representing one or more of: seasonal bias, ensemble mean, ensemble standard deviation, recent anomalies, forecasts from previous run times, or forecasts at other lead times.

8. The method of claim 3, wherein the observation dataset includes a value and a variance for the environmental variable at one or more times and the reforecast dataset includes a value, a lead time, and a variance for the environmental variable at the one or more times.

9. The method of claim 1, wherein calibrating the new forecast using the calibration function is performed by:
using the new forecast as input to the forecast climatology model to obtain a forecast climatological value;
computing a forecast anomaly based on the forecast climatological value and the new forecast;
using the forecast anomaly as input to the calibration function to generate a calibrated forecast anomaly;
generating an observational climatological value based on a time of prediction of the new forecast using the observed climatology model; and
adding the forecast anomaly to the observational climatological value to generate the calibrated forecast.

10. The method of claim 9, wherein the calibration function takes as input the value for the forecast anomaly, a variance for the forecast anomaly, and a lead time for the new forecast and produces a calibrated value for the forecast anomaly and a calibrated variance for the forecast anomaly based on the lead time.

11. A system for providing an improvement in long-range temperature forecasting using agricultural applications, the system comprising:
- one or more processors;
- one or more non-transitory computer-readable storage mediums storing one or more instructions which, when executed by the one or more processors, cause the one or more processors to perform:
- receiving an observation dataset that identifies at least a forecast climatology model;
- training a climatology model on the observation dataset to generate an observed climatology model;
- wherein the climatology model includes as covariates a combination of a linear trend and a series of harmonics;
- identifying observed anomalies based on the climatology model and the observation dataset;
- identifying forecast anomalies based on at least the forecast climatology model;
- modeling the observed anomalies as a function of the forecast anomalies to generate a calibration function that is used to correct the forecast climatology model based on the observed anomalies;
- upon receiving a new forecast produced by the forecast climatology model, calibrating the new forecast using the calibration function.

12. The system of claim 11, wherein the forecast anomalies are further identified based on a reforecast dataset that represents predictions produced by a forecast model for one or more past times and the new forecast is a prediction produced by the forecast model for a future time.

13. The system of claim 12, wherein the observation dataset further identifies values for an environmental variable that relates to temperature.

14. The system of claim 13, wherein the environmental variable is average temperature and a climatology model climatological average temperature.

15. The system of claim 11, wherein modeling the observed anomalies as a function of the forecast anomalies is performed using Nonhomogeneous Gaussian Regression.

16. The system of claim 15, wherein the Nonhomogeneous Gaussian Regression uses minimizing continuous ranked probability score or maximizing log-likelihood as an objective function.

17. The system of claim 15, wherein the Nonhomogeneous Gaussian Regression uses one or more covariants representing one or more of: seasonal bias, ensemble mean, ensemble standard deviation, recent anomalies, forecasts from previous run times, or forecasts at other lead times.

18. The system of claim 13, wherein the observed dataset includes a value and a variance for the environmental variable at one or more times and the reforecast dataset includes a value, a lead time, and a variance for the environmental variable at the one or more times.

19. The system of claim 11, wherein calibrating the new forecast using the calibration function is performed by:
- using the new forecast as input to the forecast climatology model to obtain a forecast climatological value;
- computing a forecast anomaly based on the forecast climatological value and the new forecast;
- using the forecast anomaly as input to the calibration function to generate a calibrated forecast anomaly;
- generating an observational climatological value based on a time of prediction of the new forecast using the observed climatology model; and
- adding the forecast anomaly to the observational climatological value to generate the calibrated forecast.

20. The system of claim 19, wherein the calibration function takes as input the value for the forecast anomaly, a variance for the forecast anomaly, and a lead time for the new forecast and produces a calibrated value for the forecast anomaly and a calibrated variance for the forecast anomaly based on the lead time.

* * * * *